March 27, 1928.  
F. W. FOSTER, JR  
DENTAL TRAY AND INSERT THEREFOR  
Filed July 25, 1922
1,663,695
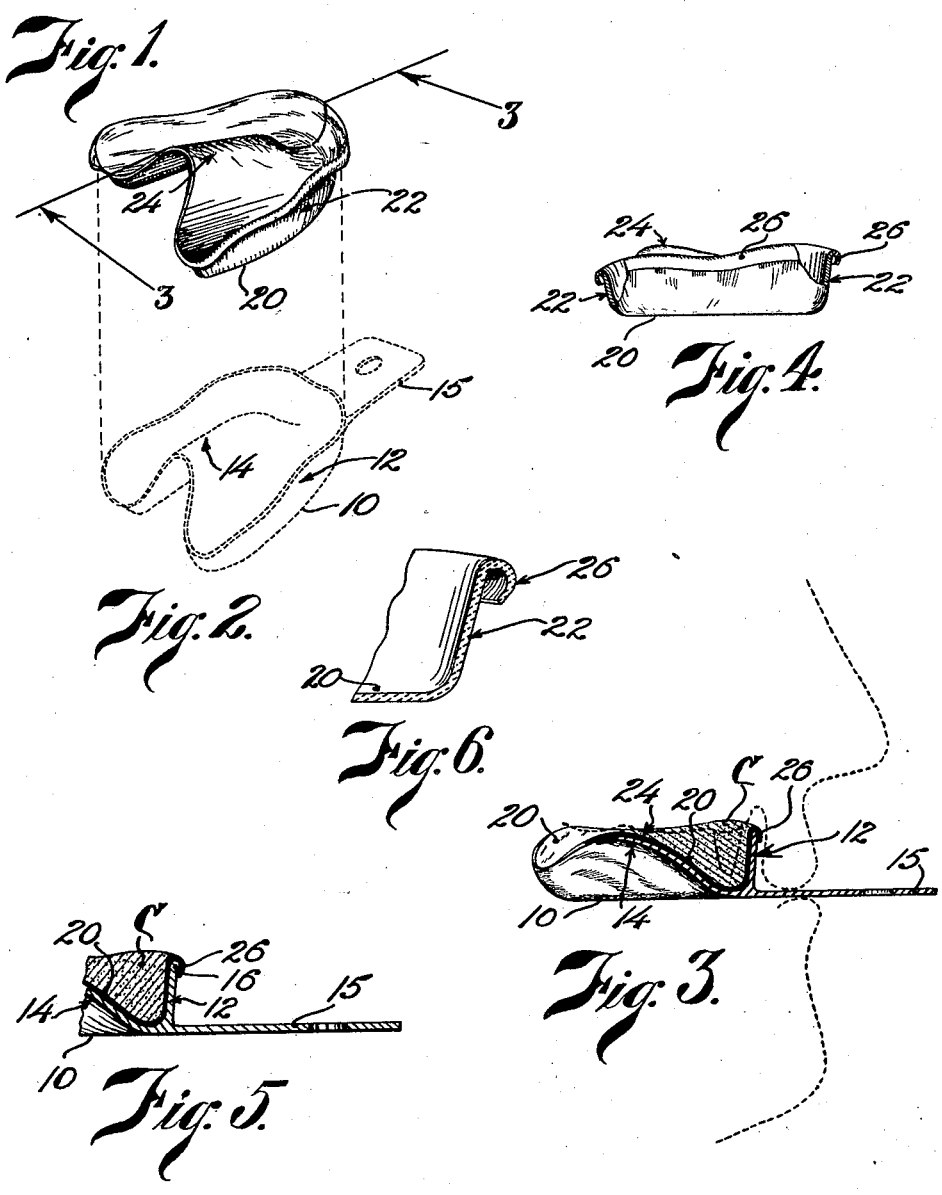

Patented Mar. 27, 1928.

1,663,695

UNITED STATES PATENT OFFICE.

FREDERIC W. FOSTER, JR., OF DENVER, COLORADO.

DENTAL TRAY AND INSERT THEREFOR.

Application filed July 25, 1922. Serial No. 577,295.

The object of this invention is to provide an insert or liner for dental trays which shall receive the composition in which the impression is made, whereby the composition may be handled in the insert or liner only and thereby protect the tray, the insert or liner being sufficiently cheap to warrant discard after a single use.

The insert or liner is preferably manufactured from some cheap material which may be molded to fit the tray with which it is used. The molded insert after being placed in the tray receives the composition; after the impression has been made and the composition has been allowed to set, the insert together with the set composition is removed from the tray and handled as a unit without the tray.

In the accompanying drawings wherein one embodiment of the invention is disclosed by way of illustration, Fig. 1 is a perspective view of the insert or liner;

Fig. 2 is a dotted perspective of the tray in which the insert is to be used;

Fig. 3 is a longitudinal section through the insert as indicated by line 3—3 of Fig. 1 and through the tray, showing some of the composition in place and indicating the use of the device;

Fig. 4 is a side elevation of the insert per se with parts broken away;

Fig. 5 is a sectional detail showing a slight modification of tray construction;

Fig. 6 is an enlarged fragmentary section showing a detail of construction of the insert or liner.

In the drawings there is shown a dental tray 10 provided with side walls 12 and a handle 15, the specific tray shown being for the purposes of taking impressions from the upper jaw and therefore having a palate piece 14 elevated as shown. In Fig. 5 this tray is shown as provided at the upper edges of its side walls 12 with a bead 16 for engagement by the insert.

The insert or liner 20 is provided with side walls 22 shaped to engage with the interior of the side walls 12 of the tray 10, and a palate piece 24 is also provided for resting upon the part 14 of the tray. The upper edges of the walls 22 of the insert are rolled over at 26 to form a lip adapted to engage over the upper edges of the walls of the tray. Preferably the lip 26 is rolled to form a sufficient portion of a circle that said lip will spring over the edges of walls 12 and positively grip the same to assist retention of the insert on the tray. This retention is more definitely assured where the bead 16 of Fig. 5 is provided on the tray walls, so that the lip 26 curves in under the bead.

The insert or liner 20 is produced from any cheap material which may be readily molded to the shape of the tray, this material preferably being slightly resilient so that the lip 26 may spring over the edges of the tray. At the same time the insert 20 should be stiff enough to handle readily without material deformation, and so that it will return to normal shape when placed in the tray. Such material may be paraffine paper of suitable weight, or fiber composition, or vulcanized fiber, or other substance of suitable qualities and cheapness.

After placing the insert in the tray, the composition C is placed therein, and the tray, insert and composition introduced into the patient's mouth in the usual way for making the impression of the teeth and gums. Thus, even though the insert be capable of yielding somewhat itself under the pressure of the jaw when making the impression, the tray 10 prevents all yielding or deformation because of its rigid construction. When the composition has set so that the impression becomes permanent, the insert and the molded composition set therein may be removed from the tray as a unit. After the molded composition has performed its function, the insert 20 may be discarded therewith. The tray 10 however is ready for further use, it being merely necessary to sterilize the same; since the composition is contained exclusively by the insert 20 the tray is never soiled with it.

Thus the tray is always ready for immediate use after the composition C has set in the insert 20.

I claim:

1. An insert for dental trays comprising a liner shaped to fit a tray and having a lip adapted to spring over the edge of a tray to insure retention on the tray.

2. In combination, a dental tray of rigid material and a relatively inexpensive insert shaped to fit the tray and having a lip sufficiently flexible and resilient to snap over the edge of the tray to retain the insert, the insert being adapted to receive the composition and protect the tray.

In testimony whereof I affix my signature.

FREDERIC W. FOSTER, JR.